US007681160B1

(12) United States Patent
Bosco et al.

(10) Patent No.: US 7,681,160 B1
(45) Date of Patent: Mar. 16, 2010

(54) WEIGHT BASED LOOK UP TABLE COLLAPSING FOR PROGRAMMABLE LOGIC DEVICES

(75) Inventors: Gilles Bosco, San Jose, CA (US); Issak Veytsman, Cupertino, CA (US); Harish Venkatappa, Newark, CA (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 60 days.

(21) Appl. No.: 11/863,016

(22) Filed: Sep. 27, 2007

(51) Int. Cl.
*G06F 17/50* (2006.01)
*G06F 9/45* (2006.01)
*H03K 17/693* (2006.01)

(52) U.S. Cl. .................. 716/6; 716/2; 716/5; 716/16
(58) Field of Classification Search .................. 716/2, 716/5, 6, 16
See application file for complete search history.

(56) References Cited

U.S. PATENT DOCUMENTS

| 6,336,208 | B1 * | 1/2002 | Mohan et al. ................ 716/16 |
| 6,711,729 | B1 * | 3/2004 | McElvain et al. ............ 716/18 |
| 6,760,899 | B1 * | 7/2004 | Young et al. ................. 716/16 |
| 6,763,506 | B1 * | 7/2004 | Betz et al. .................... 716/6 |
| 7,133,819 | B1 * | 11/2006 | Hutton ........................ 703/19 |
| 7,284,228 | B1 * | 10/2007 | Haratsaris ................... 716/16 |
| 7,401,314 | B1 * | 7/2008 | Schabas et al. .............. 716/16 |
| 2005/0132316 | A1 * | 6/2005 | Suaris et al. ................. 716/11 |
| 2007/0204252 | A1 * | 8/2007 | Furnish et al. ............... 716/10 |

OTHER PUBLICATIONS

Chen et al.; "DAOmap: A Depth-optimal Area Optimization Mapping Algorithm for FPGA Designs"; 2004; IEEE; All pages.*
Chiu et al.; "Mapping Arbitrary Logic Functions into Synchronous Embedded Memories For Area Reduction on FPGAs"; Nov. 9, 2006; ACM; All pages.*
Li et al.; "Power Minimization Algorithms for LUT-Based FPGA Technology Mapping"; 2004; ACM; All pages.*
Hu et al.; "Simultaneous Time Slack Budgeting and Retiming for Dual-Vdd FPGA Power Reduction"; Jul. 2006; ACM; All pages.*
Huang et al., An Iterative Area/Performance Trade-Off Algorithm for LUT-Based FPGA Technology Mapping, ICCAD '96, 1996, 5 pages.

* cited by examiner

*Primary Examiner*—Jack Chiang
*Assistant Examiner*—Suresh Memula
(74) *Attorney, Agent, or Firm*—Haynes and Boone, LLP (57) ABSTRACT

Various techniques are provided to selectively collapse connections. In one example, a computer readable medium includes a computer program for performing a method of selectively collapsing connections between a plurality of LUTs. The method includes performing a first timing analysis to determine a timing slack value for each connection and determine a number of timing paths using each connection. The method also includes calculating a weight for each connection based on at least the timing slack value and the number of timing paths. The method further includes comparing the connections associated with a first one weight interval with collapsing criteria, wherein the first weight interval includes weights larger than weights of the remaining weight intervals. The method also includes collapsing the connections associated with the first weight interval that satisfy the collapsing criteria, and selectively repeating the comparing and collapsing for connections associated with remaining weight intervals.

17 Claims, 5 Drawing Sheets

WEIGHT BASED LOOK UP TABLE COLLAPSING FOR PROGRAMMABLE LOGIC DEVICES

TECHNICAL FIELD

The present invention relates generally to programmable logic and, more particularly, to the optimization of logic designs for programmable logic devices.

BACKGROUND

Programmable logic devices (PLDs), such as field programmable gate arrays (FPGAs) or complex programmable logic devices (CPLDs), may be programmed to provide various user-defined features. For example, a PLD may be implemented with look up tables (LUTs) configured to provide logic operations corresponding to a logic design specified by configuration data programmed into configuration memory of the PLD. These logic operations may be initially identified by a netlist that specifies the logical relationships and connections between LUTs of the PLD. Such connections and relationships may be visualized using directed acyclic graphs (DAGs) as such graphs are known in the art.

After a netlist is prepared, it is processed by appropriate software to prepare configuration data for programming into the PLD. Generally, this processing includes attempts to collapse one or more of the connections between the LUTs in order to simplify the configuration of the PLD. For example, one or more connections between the LUTs may be collapsed in order to reduce the number of connections, number of LUTs, signal path lengths, and/or number of logic levels used by the design. This can reduce the complexity of the logic design implemented by the PLD.

Unfortunately, conventional LUT connection collapsing processes typically consider very limited criteria in deciding whether to collapse LUT connections, thus resulting in logic designs that fail to satisfy other performance attributes. For example, one known connection collapsing process collapses connections to reduce the number of logic levels of a logic design. However, by focusing exclusively on the number of logic levels, this approach ignores the effects such collapsing may have on other aspects of the logic design. For example, this approach may cause non-critical paths having large numbers of logic levels to be collapsed, while ignoring critical timing paths having few logic levels.

Another known connection collapsing process uses the maximum size LUTs available for a given PLD to collapse as many connections as possible, including connections with non-critical timing attributes. Nevertheless, the many large LUTs used by this approach consume significant PLD routing resources. Because a PLD may have significantly different routing resources for minimum size LUTs and maximum size LUTs, this approach can severely impact the routing delays associated with critical timing paths.

As a result, there is a need for an improved approach to the collapsing of LUT-based connections that considers a variety of criteria. In particular, there is a need for such an approach for use with PLDs.

SUMMARY

In accordance with one embodiment of the present invention, a computer readable medium includes a computer program for performing a method of selectively collapsing connections between a plurality of look up tables (LUTs) of a logic design to be implemented by a programmable logic device (PLD), the method includes performing a first timing analysis to determine a timing slack value for each connection and determine a number of timing paths using each connection; calculating a weight for each connection, wherein the weight is based on at least the timing slack value of the connection and the number of timing paths using the connection; associating each connection with one of a plurality of weight intervals based on the weight of the connection, wherein each of the weight intervals comprises an associated range of weights; comparing the connections associated with a first one of the weight intervals with collapsing criteria, wherein the first weight interval includes weights larger than weights of the remaining weight intervals; collapsing the connections associated with the first weight interval that satisfy the collapsing criteria; and selectively repeating the comparing and collapsing for connections associated with the remaining weight intervals.

In accordance with another embodiment of the present invention, a system includes one or more processors; and one or more memories adapted to store a plurality of computer-readable instructions which when executed by the one or more processors are adapted to cause the system to perform a method of selectively collapsing connections between a plurality of look up tables (LUTs) of a logic design to be implemented by a programmable logic device (PLD), the method includes: performing a first timing analysis to determine a timing slack value for each connection and determine a number of timing paths using each connection, calculating a weight for each connection, wherein the weight is based on at least the timing slack value of the connection and the number of timing paths using the connection, associating each connection with one of a plurality of weight intervals based on the weight of the connection, wherein each of the weight intervals comprises an associated range of weights, comparing the connections associated with a first one of the weight intervals with collapsing criteria, wherein the first weight interval includes weights larger than weights of the remaining weight intervals, collapsing the connections associated with the first weight interval that satisfy the collapsing criteria, and selectively repeating the comparing and collapsing for connections associated with the remaining weight intervals.

In accordance with another embodiment of the present invention, a system for selectively collapsing connections between a plurality of look up tables (LUTs) of a logic design to be implemented by a programmable logic device (PLD) includes means for performing a first timing analysis to determine a timing slack value for each connection and determine a number of timing paths using each connection; means for calculating a weight for each connection, wherein the weight is based on at least the timing slack value of the connection and the number of timing paths using the connection; means for associating each connection with one of a plurality of weight intervals based on the weight of the connection, wherein each of the weight intervals comprises an associated range of weights; means for comparing the connections associated with a first one of the weight intervals with collapsing criteria, wherein the first weight interval includes weights larger than weights of the remaining weight intervals; means for collapsing the connections associated with the first weight interval that satisfy the collapsing criteria; and means for selectively repeating the comparing and collapsing for connections associated with the remaining weight intervals.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

In accordance with various techniques described herein, connections between look up tables (LUTs) may be selectively collapsed using various collapsing criteria. For example, such LUTs may be part of a logic design to be implemented by a programmable logic device (PLD).

In one embodiment, a weight is calculated for each LUT connection of a directed acyclic graph (DAG) based on the timing slack of the connection and the number of timing paths using the connection. Individual connections are partitioned into a plurality of weight intervals and considered for collapsing on an interval-by-interval basis using various collapsing criteria based on the calculated weights.

Advantageously, because the weight calculation is based on both the timing slack of the connection as well as the number of timing paths using the connection, collapsing decisions using weight-based collapsing criteria can be performed in a manner that not only reduces critical paths through the logic design, but also alleviates complexity of the logic design to simplify placement and routing of the logic design.

In one embodiment, the collapsing criteria may specify a plurality of LUT size ranges. In this regard, large size LUTs may be used to collapse connections with large weights, but not used to collapse connections with smaller weights. Large LUTs often offer less flexibility in routing and consume more PLD resources than smaller LUTs. Accordingly, by using large LUTs to collapse critical connections (e.g., connections associated with large weights), PLD resources and routing flexibility are not compromised for non-critical connections.

In another embodiment, LUTs having large numbers of inputs are not used to collapse connections having a weight of zero (e.g., connections that are not part of timing paths). As similarly described above, this technique prevents PLD resources and routing flexibility from being compromised for non-critical connections.

In another embodiment, the collapsing criteria may specify a minimum weight percentage. In this regard, connections having a minimum weight (e.g., a percentage of the maximum weight of connections fanning in to a LUT) may be collapsed. This technique can reduce the overall number of critical paths of a logic design and therefore reduce routing delays.

In another embodiment, a timing analysis to determine timing slack values of the LUT connections is performed once for each weight interval, but is not required to be performed after each connection is collapsed. As a result, multiple connections may be collapsed without requiring excessive computational time for recalculating the timing slack of all connections each time an individual connection is collapsed. A trade-off between the accuracy of the timing slack values and run time can be determined by using different numbers of intervals.

Figure 1:
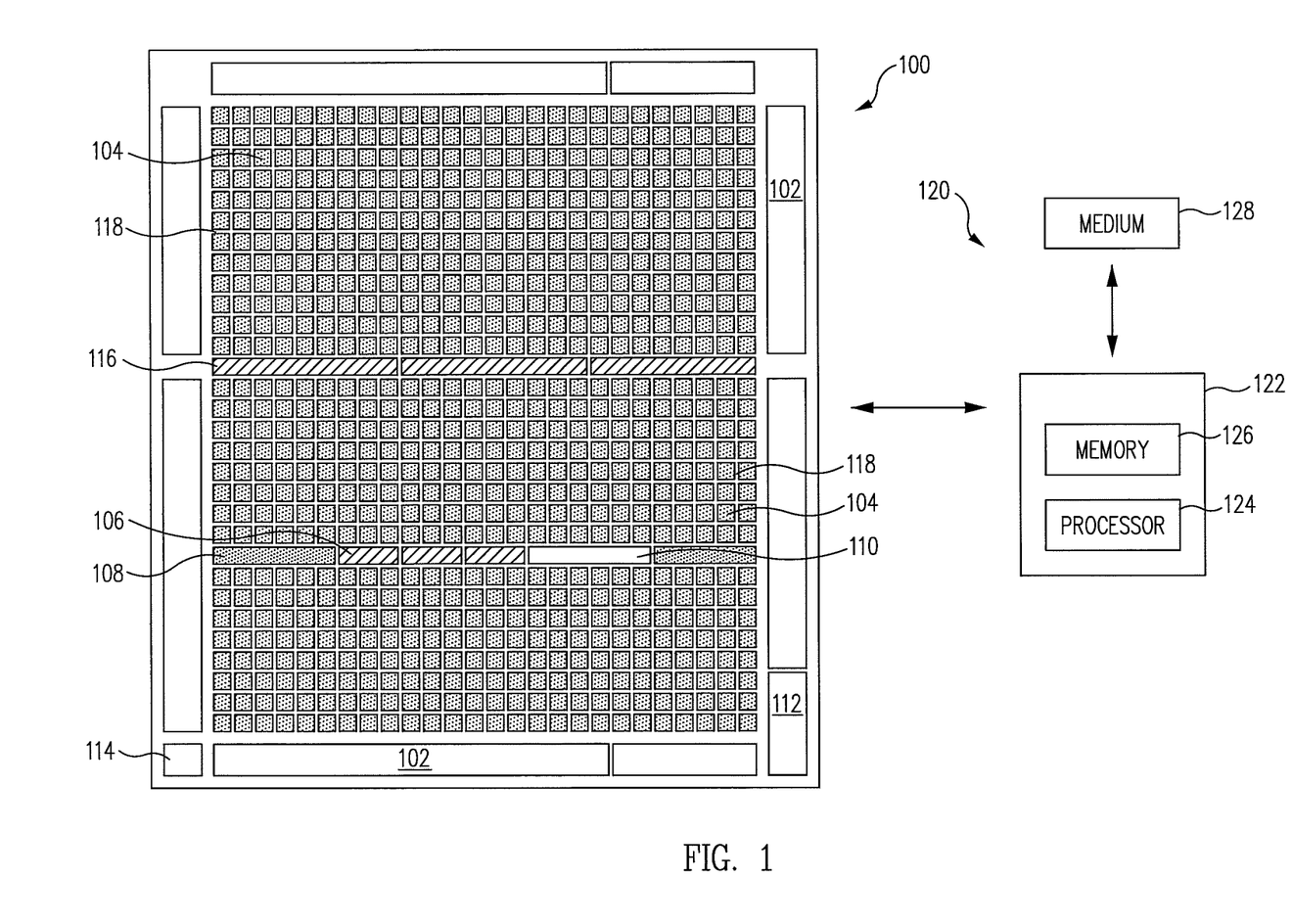
FIG. 1 illustrates a block diagram of a programmable logic device (PLD) and a system for preparing configuration data for use with the PLD in accordance with an embodiment of the invention.

FIG. 1 illustrates a block diagram of a programmable logic device (PLD) 100 and a system 120 for preparing configuration data for use with PLD 100 in accordance with an embodiment of the invention. PLD 100 (e.g., a field programmable gate array (FPGA), a complex programmable logic device (CPLD), a field programmable system on a chip (FPSC), or other type of programmable device) generally includes input/output (I/O) blocks 102 and logic blocks 104 (e.g., also referred to as programmable logic blocks (PLBs), programmable functional units (PFUs), or programmable logic cells (PLCs)). I/O blocks 102 provide I/O functionality (e.g., to support one or more I/O and/or memory interface standards) for PLD 100, while programmable logic blocks 104 provide logic functionality (e.g., LUT-based logic or logic gate array-based logic) for PLD 100.

PLD 100 may also include blocks of memory 106 (e.g., blocks of EEPROM, block SRAM, and/or flash memory), clock-related circuitry 108 (e.g., PLL and/or DLL circuits), configuration logic 110 (e.g., for startup, decryption, encryption, multiple-boot support (e.g., dual boot support), and/or error detection), a configuration port 112, configuration memory 114, special function blocks 116 (e.g., digital signal processing (DSP) blocks or other forms of multiply and accumulate circuit functionality), and/or routing resources 118. In general, the various elements of PLD 100 may be used to perform their intended functions for the desired application, as would be understood by one skilled in the art.

For example, configuration port 112 may be used for programming PLD 100, such as memory 106 and/or configuration memory 114 or transferring information (e.g., various types of data and/or control signals) to/from PLD 100 as would be understood by one skilled in the art. For example, configuration port 112 may include a first programming port (which may represent a central processing unit (CPU) port, a peripheral data port, a serial peripheral interface, and/or a sysCONFIG programming port) and/or a second programming port such as a joint test action group (JTAG) port (e.g., by employing standards such as Institute of Electrical and Electronics Engineers (IEEE) 1149.1 or 1532 standards).

Configuration port 112 typically, for example, may be included to receive configuration data and commands to support serial or parallel device configuration and information transfer.

It should be understood that the number and placement of the various elements, such as I/O blocks 102, logic blocks 104, memory 106, clock-related circuitry 108, configuration logic 110, configuration port 112, configuration memory 114, special function blocks 116, and routing resources 118, are not limiting and may depend upon the desired application. For example, special function blocks 116 are optional and various other elements may not be required for a desired application or design specification (e.g., for the type of programmable device selected).

Furthermore, it should be understood that the elements are illustrated in block form for clarity and that certain elements, such as for example configuration memory 114 or routing resources 118, would typically be distributed throughout PLD 100, such as in and between logic blocks 104, to perform their conventional functions (e.g., storing configuration data that configures PLD 100 or providing interconnect structure within PLD 100, respectively). It should also be understood that the various embodiments of the present invention as disclosed herein are not limited to programmable logic devices, such as PLD 100, and may be applied to various other types of programmable devices, as would be understood by one skilled in the art.

System 120 includes a computing device 122 and a computer-readable medium 128. As shown, computing device 122 includes a processor 124 and a memory 126. Processor 124 may be configured with appropriate software (e.g., a computer program for execution by a computer) that is stored on computer-readable medium 128 and/or in memory 126 to instruct processor 124 to perform one or more of the operations described herein. For example, in one embodiment, computer-readable medium 128 stores software to instruct processor 124 to: perform a first timing analysis to determine a timing slack value for each connection between a plurality of LUTs and determine a number of timing paths using each connection, calculate a weight for each connection, wherein the weight is based on at least the timing slack value of the connection and the number of timing paths using the connection; associate each connection with one of a plurality of weight intervals based on the weight of the connection, wherein each of the weight intervals comprises an associated range of weights; compare the connections associated with a first one of the weight intervals with collapsing criteria, wherein the first weight interval includes weights larger than weights of the remaining weight intervals; collapse the connections associated with the first weight interval that satisfy the collapsing criteria; and selectively repeat the comparing and collapsing for connections associated with the remaining weight intervals. In another embodiment, memory 126 may store such software. In yet another embodiment, such software may be stored at least in part by computer-readable medium 128 and at least in part by memory 126.

Processor 124 and memory 126 may be implemented in accordance with any appropriate components that may be used to provide computing system 120. Similarly, computer-readable medium 128 may be implemented using any appropriate type of machine-readable medium used to store software. System 120 may be implemented to provide configuration data prepared by system 120 to PLD 100 through, for example, configuration port 112.

Figure 2A:
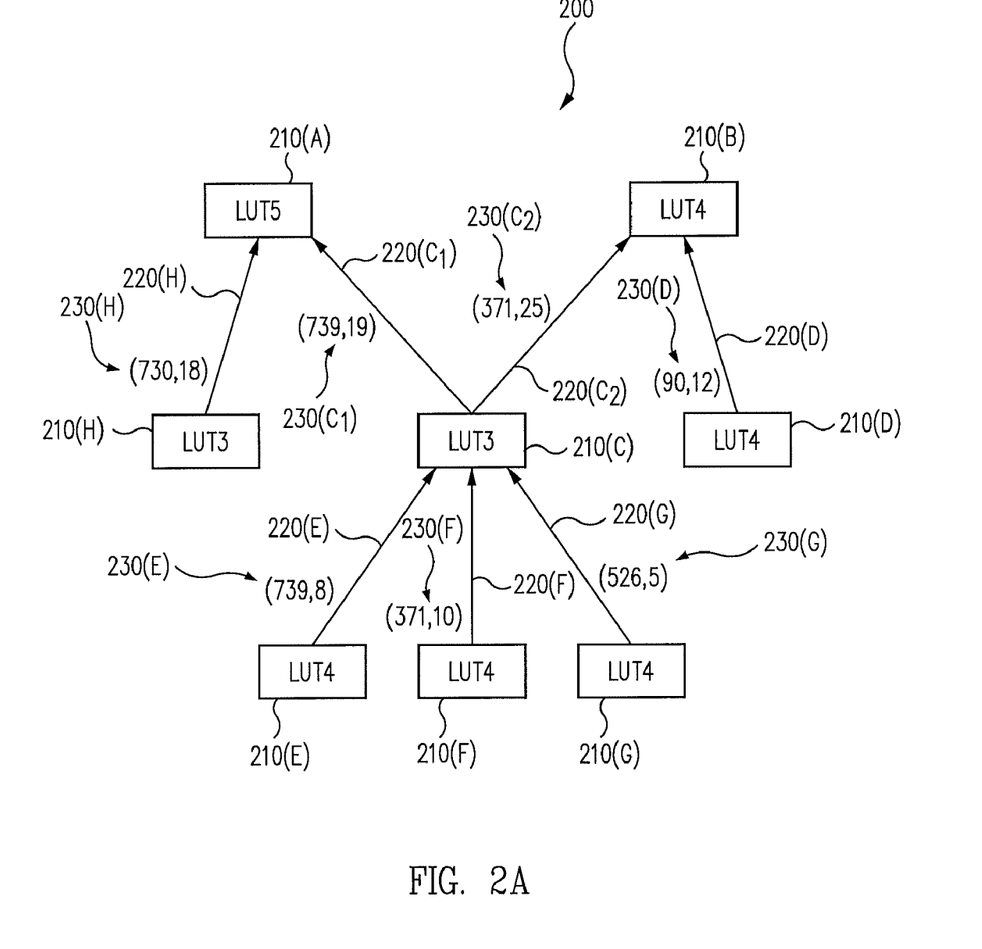
FIGS. 2A-C illustrate directed acyclic graphs (DAGs) in accordance with embodiments of the invention.

FIG. 2A illustrates a DAG 200 in accordance with an embodiment of the invention. DAG 200 may correspond, for example, to a logic design specified by a netlist prepared by a user or appropriate software. As shown in FIG. 2A, DAG 200 illustrates a plurality of LUTs 210 (labeled 210(A) to 210(H)) linked with each other through a plurality of connections 220 (labeled 220(A) to 220(H)). For example, in one embodiment, DAG 200 may be used to illustrate connections between various LUTs of logic blocks 104 of PLD 100. In other embodiments, additional or larger DAGs may be used to illustrate connections between other LUTs of logic blocks 104 of PLD 100.

Each of LUTs 210 may be implemented to receive various numbers of inputs as identified in FIG. 2A. For example, LUT 210(C) is labeled "LUT3" to identify that LUT 210(C) is a three input LUT which may receive three connections 220 (E), 220(F), and 220(G). As shown in FIG. 2A, various LUTs 210 may be implemented with different numbers of inputs. In addition, in certain embodiments, some inputs of LUTs 210 may not be used, or their associated connections may not be shown. For example, although LUT 210(B) is identified as a four input LUT, only two connections (i.e., connections 220 (C2) and 220(D)) to LUT 210(B) are shown in FIG. 2A.

A set of timing constraints may be associated with a given logic design, such as that represented by DAG 200. These timing constraints may include, for example, frequency goals for existing clocks as well as clock-to-output timing and clock setup constraints and from-to delays (e.g., arbitrary constraints between any output pin and any input pin in the logic design) for PLD 100.

In order to determine whether a given logic design meets such timing constraints, conventional timing analyzer software may be used to determine a plurality of connection parameters 230 (labeled 230(A) through 230(H)). As shown in FIG. 2A, connection parameters 230 include a pair of integers associated with each one of connections 220 in the form (s, n). The parameter s is the maximum timing slack (timing violation) of all timing paths of the logic design using the associated connection 220. The parameter n is the total number of timing paths of the logic design using the associated connection 220. In one embodiment, any connections 220 that are not included in any timing path of the logic design are given a timing slack value equal to zero (not shown in FIG. 2A).

For example, in FIG. 2A, connection parameters 230(C1) are shown as the pair (739, 19) which identify that at least one of the timing paths using connection 220(C1) exceeds a timing constraint by 739 ps, and that 19 timing paths (e.g., paths through DAG 200 having timing constraints) use connection 220(C1). Three of these timing paths are shown in FIG. 2A which correspond to the following timing paths: between LUT 210(E) and LUT 210(A); between LUT 210(F) and LUT 210(A); and between LUT 210(G) and LUT 210(A). In this regard, additional timing paths (not shown) may fan into various LUTs 210 of DAG 200. Additional connection parameters 230 are shown for the remaining connections 220 of FIG. 2A.

Connection parameters 230 may be used to calculate a weight for each connection 220. These weights can be used along with additional collapsing criteria to selectively collapse individual connections 220 as further described herein. In one embodiment, the weight w of a given connection may be calculated as: w=log(n+1)*s, where n and s are connection parameters 230 as previously described.

The calculated weights of each connection 220 of FIG. 2A (rounded to the nearest integer in this embodiment) are illustrated in the following Table 1:

TABLE 1

| Connection 220 | Parameters 230 (s, n) | Weight (w) |
| --- | --- | --- |
| 220 (C1) | (739, 19) | 961 |
| 220 (C2) | (371, 25) | 525 |
| 220 (D) | (90, 12) | 100 |
| 220 (E) | (739, 8) | 705 |
| 220 (F) | (371, 10) | 386 |
| 220 (G) | (526, 5) | 409 |
| 220 (H) | (730, 18) | 933 |

Figure 2B:
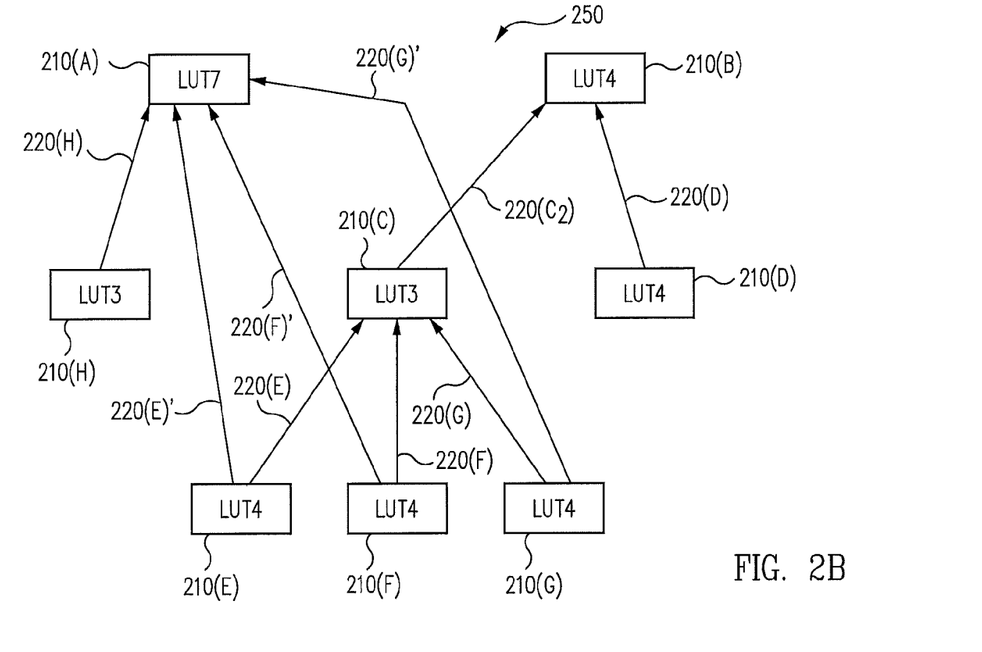
Figure 2C:
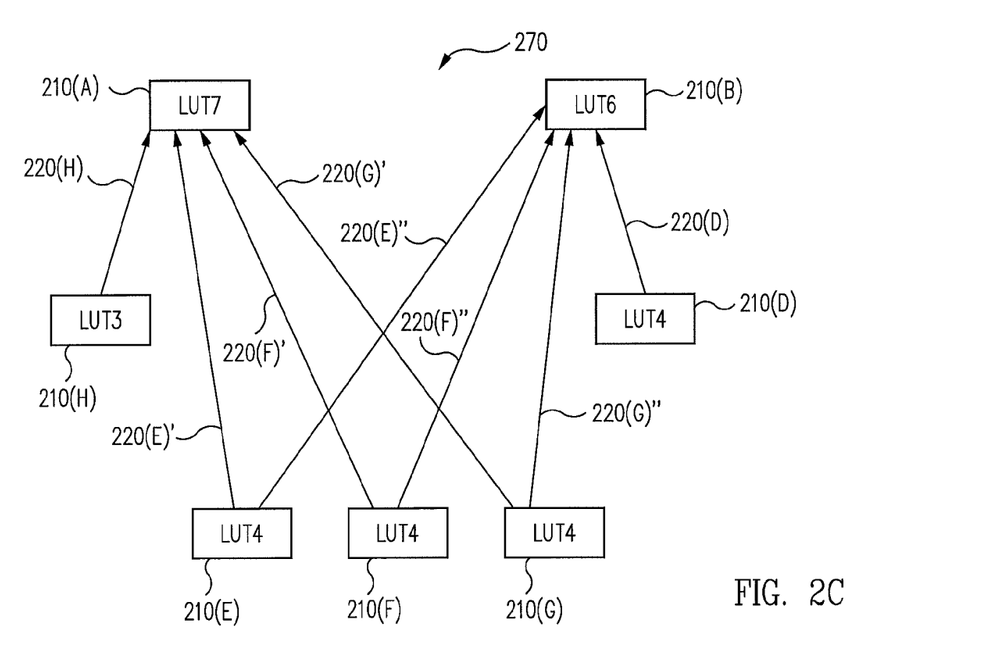
Figure 3:
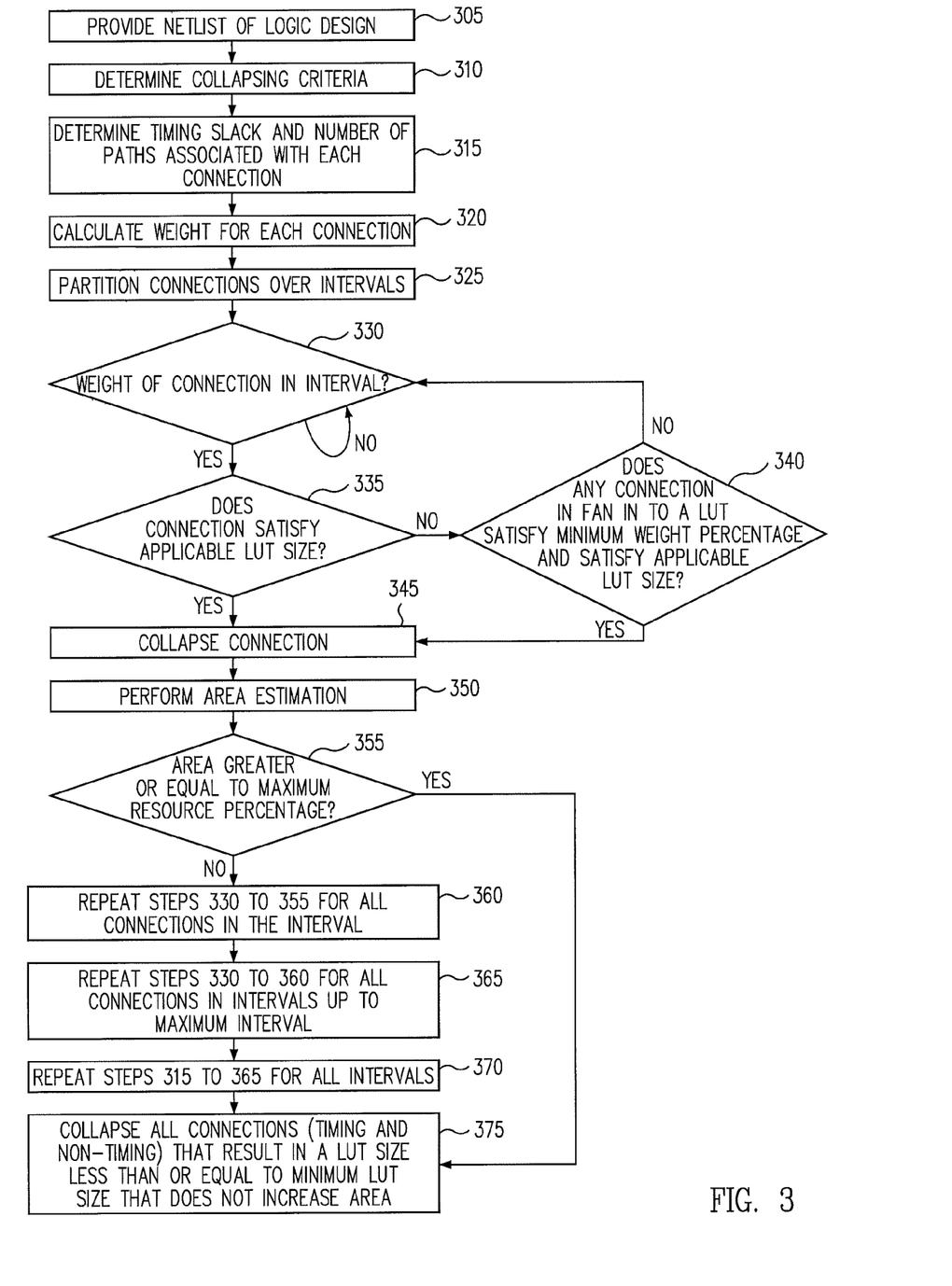
FIG. 3 illustrates a process of selectively collapsing look up table (LUT) connections in accordance with an embodiment of the invention.

FIG. 3 illustrates a process of selectively collapsing LUT connections in accordance with an embodiment of the invention. For example, in one embodiment, the process of FIG. 3 may be used to collapse various connections 220 of DAG 200 illustrated in FIG. 2A. Although the process of FIG. 3 will be described in relation to PLD 100 and FIGS. 2A-2C, the process may be used for selectively collapsing LUT connections of any desired logic design for any appropriate PLD.

In initial step 305, a netlist is provided that corresponds to a logic design to be implemented in PLD 100. The netlist may be generated by a user or appropriate software in accordance with known techniques to identify LUT 210 and connections 220 that may be used to implement a desired logic design. For example, DAG 200 of FIG. 2A may correspond to graphical representation of a netlist provided in step 305.

In step 310, various connection collapsing criteria are determined. Such criteria may be specified by a user, software, or other appropriate methods. In one embodiment, the collapsing criteria determined in step 310 includes a number of weight intervals, a minimum weight percentage, and a plurality of LUT size ranges described below.

Figure 4:
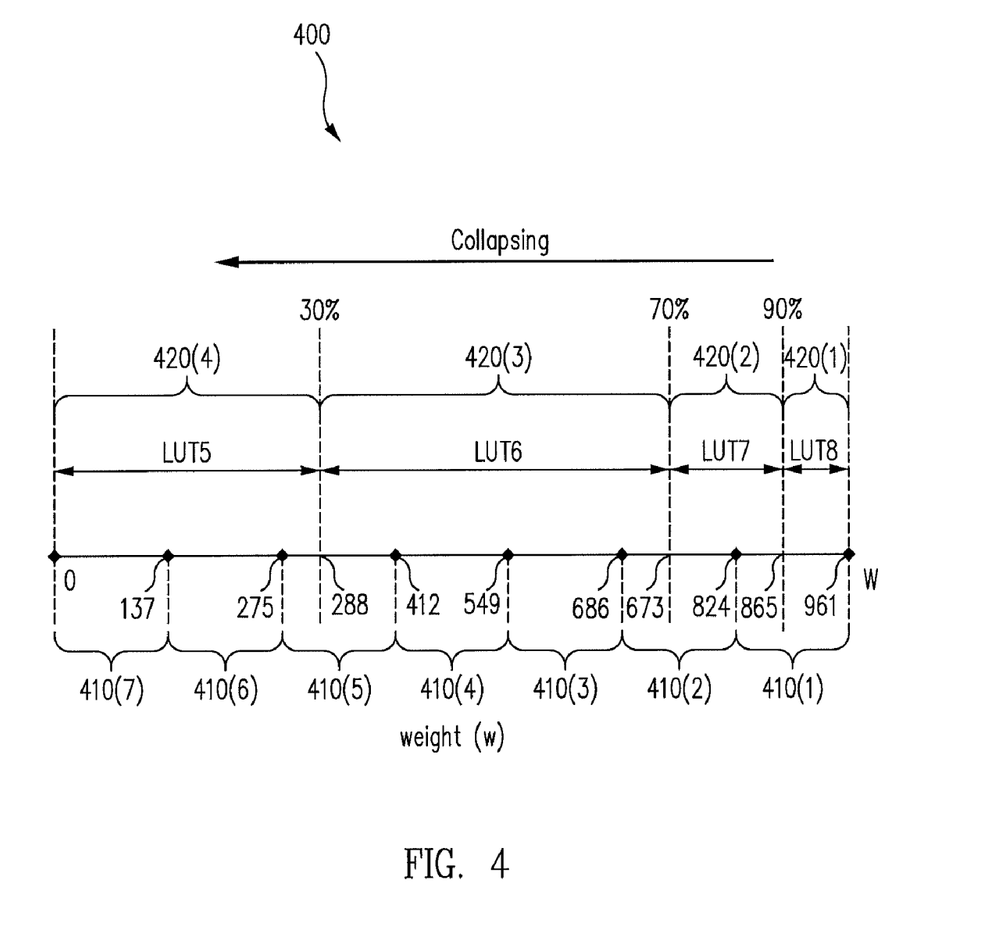
FIG. 4 illustrates a graph representing various collapsing criteria in accordance with an embodiment of the invention.

Regarding the number of weight intervals criteria, connections 220 may be grouped by weight and considered for collapsing on an interval-by-interval basis. The weight intervals can be further understood with reference to FIG. 4 which illustrates a graph representing various collapsing criteria in accordance with an embodiment of the invention. In this regard, FIG. 4 illustrates a plurality of weight intervals 410 (labeled 410(1) through 410(7)) distributed along an axis corresponding to a range of weights w calculated for connections 220. In the particular embodiment represented in FIG. 4, seven weight intervals are shown. However, other numbers of weight intervals (for example, 15 weight intervals) may be used in other embodiments. The maximum weight W in FIG. 4 corresponds to the maximum weight of any of connections 220. For example, in an embodiment using the weights set forth in Table 1 above, maximum weight W corresponds to a weight of 961. The weight ranges of weight intervals 410 are also shown in FIG. 4 rounded to the nearest integer.

The minimum weight percentage criteria may be used to identify a minimum weight to be satisfied by a connection 220 before it may be collapsed. As previously described, a weight may be calculated for each of connections 220. The largest weight of all connections 220 fanning into a given LUT 210 is multiplied by the minimum weight percentage to provide a minimum weight. In one embodiment, in order to satisfy the minimum weight percentage collapsing criteria, a connection 220 must have a weight greater or equal to the calculated minimum weight. For example, in one embodiment, the minimum weight percentage may be specified as 80 percent which would result in a minimum weight of 80 percent of the largest weight of all connections 220 fanning into a given LUT 210.

The LUT size range criteria is specified by a plurality of couples (L, P), where L is a LUT size (e.g., the number of connections that a LUT may receive) and P is the percentage of a maximum weight W down to which LUT size L is accepted. For example, four LUT size ranges are shown in FIG. 4 corresponding to a set of four couples: (8, 90), (7, 70), (6, 30), (5, 0). In this regard, a plurality of LUT size ranges 420 (labeled 420(1) through 420(4)) are shown corresponding to the four couples. Range 420(1) identifies that LUTs having up to eight inputs may be used to collapse connections having a weight of at least 90 percent of maximum weight W. Similarly, range 420(2) identifies that LUTs having up to seven inputs may be used to collapse connections having a weight of at least 70 percent of maximum weight W. Ranges 420(3) and 420(4) can be similarly understood.

Turning again to FIG. 3, in step 315, connection parameters 230 are determined for each of connections 220. In this regard, conventional timing analyzer software of system 120 may be used to determine the maximum timing slack of all the timing paths using each of connections 220, as well as the total number of timing paths using each of connections 220. The timing analysis performed in step 315 considers all timing paths of a given logic design which may include many thousands of LUTs and connections, depending on the particular logic design and the architecture of PLD 100.

In one embodiment, step 315 is a time-intensive step which may require a timing analysis to be performed on all connections 220 of a logic design. Advantageously, as shown in FIG. 3, step 315 is not repeated until all connections 220 associated with a given weight interval 410 are considered for collapsing, thereby saving processing time.

In step 320, system 120 calculates the weight associated with each of connections 220. These weights may be determined in the manner previously described above to provide the weight values of Table 1.

In step 325, system 120 partitions connections 220 over weight intervals 410. In this regard, each of the weights calculated in step 320 may correspond to a particular one of weight intervals 410 specified in step 315. Accordingly, each of connections 220 may be associated with a particular one of weight intervals 410 of FIG. 4 by its corresponding weight. For example, considering the weights identified in Table 1, it will be appreciated that connection 220(C1) has a weight 961 and is therefore associated with weight interval 410(1). Reviewing the weights of the remaining connections 220, it is apparent that connections 220(C2), 220(D), 220(E), 220(F), 220(G), and 220(H) are associated with weight intervals 410 (4), 410(7), 410(2), 410(5), 410(5), and 410(1), respectively.

Following step 325, system 120 begins processing the various connections 220 of DAG 200 on an interval-by-interval basis. In this regard, each of the connections 220 associated with a particular weight interval 410 are considered as candidates for possible collapse before connections 220 associated with the next weight interval 410 are considered.

In one embodiment, weight intervals 410 are considered in order of weight, with weight interval 410(1) having the largest weights considered first. For example, in step 330, system 120 begins processing the various connections 220 associated with weight interval 410(1). Therefore, in step 330, system 120 determines whether a first connection (for example, connection 220(C1)) falls within weight interval 410(1). As identified above, connection 220(C1) is associated with weight interval 410(1). Therefore, upon considering connection 220 (C1) in step 330, the process continues to step 335. However, if connection 220(C1) considered in step 330 did not fall within weight interval 410(1), then step 330 would repeated for another connection 220.

In step 335, system 120 determines whether connection 220(C1) satisfies the applicable LUT size range criteria identified in step 310. If connection 220(C1) satisfies the applicable LUT size range criteria, then the process continues to step 345. Otherwise, the process continues to step 340.

In one embodiment, step 335 may include comparing connection 220(C1) with LUT size ranges 420 illustrated in FIG. 4. Connection 220(C1) has a weight of 961 and therefore falls within LUT size range 420(1) (corresponding to weights from 865 to 961). As also shown in FIG. 4, LUT size range 420(1) identifies that LUTs 210 having a maximum of 8 inputs may be used to collapse connections 220 having weights from 865 to 961.

As shown in FIG. 2A, LUT 210(C) receives connections 220(E), 220(F), and 220(G) from LUTs 210(E), 210(F), and 210(G), respectively. If connection 220(C1) is collapsed into LUT 210(A), then a new connection from each of LUTs 210(E), 210(F), and 210(G), may be provided to LUT 210(A) in order to implement timing paths previously serviced by connection 220(C1).

Because LUT 210(A) is identified as a five input LUT receiving only a single connection 220(C1) in FIG. 2A, it will be appreciated that it can accommodate three new connections from each of LUTs 210(E), 210(F), and 210(G) used to replace connection 220(C1), for a net total of three inputs fanning in to LUT 210(A). However, if all inputs of LUT 210(A) were already used by connection 220(C1) and four additional connections (not shown), then LUT 210(A) would need to be replaced by a seven input LUT in order to accommodate the new connections from LUTs 210(E), 210(F), and 210(G). As shown in FIG. 4, LUTs having up to eight inputs can be used to collapse connections 220 in LUT size range 420(1). Because a seven input LUT is within this range, connection 220(C1) would still satisfy the LUT size range criteria.

However, if connection 220(C1) does not satisfy the minimum LUT size range criteria (for example, assuming that connection 220(C1) is associated with a different weight or if different LUT size ranges are used), then the process continues to step 340. Otherwise, the process returns to step 330 where another connection is considered.

In step 340, system 120 determines whether any other connections 220 fanning in to the currently considered LUT 210 satisfy the minimum weight percentage collapsing criteria and applicable LUT size range identified in step 310.

In this regard, the minimum weight percentage collapsing criteria may be satisfied by a connection 220 having a weight greater or equal to a minimum weight determined by multiplying the largest weight of all connections 220 fanning into the currently considered LUT 210 (in this example, LUT 210(A)) by the minimum weight percentage (for example, 80 percent). For example, as shown in FIG. 2A, connection 220(H) fans in to LUT 210(A). As identified in Table 1, connection 220(H) has a weight of 933. The largest weight of all connections 220 fanning in to LUT 210(A) is provided by connection 220(C1) which has a weight of 966. As such, connection 220(H) has a weight greater than 80 percent of the weight of connection 220(C1). Accordingly, connection 230(H) satisfies the minimum percentage collapsing criteria in this example.

Also in step 340, system 120 determines whether connection 230(H) further satisfies the applicable LUT size range 420 as similarly described above in relation to connection 220(C1) in step 335. For example, it will be appreciated that because connection 220(H) has a weight 933 which is greater than 90 percent of maximum weight 961, LUT size range 420(1) will apply. If the collapsing of connection 220(H) satisfies LUT size range 420(1), then the process of FIG. 3 continues to step 345. Otherwise, the process returns to step 330 where another connection 220 is considered.

In step 345, the current connection 220 (for example, connection 220(C1) or connection 220(H)) is collapsed into LUT 210(A). FIG. 2B illustrates a DAG 250 showing connection 220(C1) collapsed into LUT 210(A) following step 345 in accordance with an embodiment of the invention. As shown in FIG. 2B, connection 220(C1) has been replaced by three connections 220(E)', 220(F)', and 220(G)' from LUTs 210(E), 210(F), and 210(G), respectively. LUT 210(A) has also been changed to a seven input LUT.

In step 350, system 120 performs an area estimation to determine the area of PLD 100 consumed by the logic design. In this regard, as the sizes of LUTs 210 and the numbers of connections 220 are adjusted during the process of FIG. 3, the corresponding area of PLD 100 used to implement the logic design may grow. In step 355, system 120 evaluates the area estimation. If the area is estimated to reach or exceed a particular percentage of all resources of PLD 100 (for example, 80 percent or 90 percent), then the process of FIG. 3 proceeds to step 375. Otherwise, the process continues to step 360.

In step 360, the process of FIG. 3 repeats steps 330 to 355 for all remaining connections 220 in the current processed weight interval 410(1). In the particular embodiment shown in FIG. 2B, no additional connections 220 have weights in the range of weight interval 410(1). Because a timing analysis has not yet been performed on new connections 220(E)', 220(F)', and 220(G)', they will have a weight of zero and therefore will not be considered for collapsing until their associated connection parameters (e.g., timing slack and associated number of timing paths) have been determined. Accordingly, no additional connections 220 will be collapsed in this iteration of step 360 of this embodiment.

In step 365, the process of FIG. 3 repeats steps 330 to 365 for each of the remaining weight intervals up to the maximum weight interval (e.g., weight intervals 410(2) through 410(7) in this embodiment). However, if the area of PLD 100 exceeds the maximum resource percentage as determined in a subsequent iteration of step 355 for another weight interval, any further remaining weight intervals will not be processed in step 365.

In step 370, the process of FIG. 3 repeats steps 315 to 365 for all weight intervals 410. In this regard, it will be appreciated that the timing slack and number of paths determined in successive iterations of step 315 may change as a result of collapsing performed in step 345. As a result, the particular weights calculated in successive iterations of step 320 may also change, and connections 220 may therefore be associated with different intervals 410 in successive iterations of step 325. Accordingly, various connections 220 that did not satisfy collapsing criteria in a previous iteration of steps 315 to 365 may potentially be collapsed when associated with a different weight interval 410 as steps 315 through 365 are repeated in step 370. However, similar to step 365, if the area of PLD 100 exceeds the maximum resource percentage as determined in a subsequent iteration of step 355 for another weight interval, any further remaining weight intervals will not be processed in step 370.

It will be appreciated that during the process of FIG. 3, additional connections 220 of DAG 250 may be collapsed if the various collapsing criteria are satisfied in the manner described. Depending on the particular collapsing criteria and connection parameters of a given embodiment, all connections fanning out from a given LUT may be collapsed such that the LUT may be removed from the logic design. For example, if connection 220(C2) illustrated in DAG 250 is collapsed in another embodiment, connections 220(E), 220(F), and 220(G) may be replaced by new connections provided directly between LUTs 210(E), 210(F), and 210(G), and LUT 210(B).

In this regard, FIG. 2C illustrates a DAG 270 in which connection 220(C2) has been collapsed and LUT 210(C) has been removed. As shown in FIG. 2C, connection 220(C2) has been replaced by new connections 220(E)", 220(F)", and 220(G)" which are provided directly to LUT 210(B) to bypass LUT 210(C). LUT 210(B) has also been changed to a six input LUT. Advantageously, the removal of LUT 210(c) can further simplify the logic design shown in DAG 270.

Turning again to FIG. 3, after completion of step 370, all connections 220 having weights greater than zero will have been collapsed if they meet the various collapsing criteria previously described. In step 375, any remaining connections 220 that would result in a LUT size less than or equal to the minimum LUT size of PLD 100 (for example, a minimum four input LUT size) are collapsed to further simplify the logic design. Advantageously, because LUT sizes are not increased beyond the minimum LUT size of the logic design in step 375, the area of PLD 100 consumed by the logic design does not increase as a result of such collapsing.

Following the process of FIG. 3, system 120 may perform a conventional placement and routing process as well as a conventional configuration data generation process to prepare configuration data for loading into configuration memory 114 of PLD 100.

In view of the present disclosure, it will be appreciated that approaches set forth in various embodiments described herein can be used to consider a variety of criteria when collapsing LUT connections. For example, by determining a weight for each connection, the connections can be distributed over a plurality of weight intervals and processed on an interval-by-interval basis. Because the weight of each connection is based on both timing slack and the number of timing paths using the connection, both of these factors can influence the order in which a given connection is considered for collapsing relative to other connections.

In addition, by considering minimum weight percentage criteria, connections having weights in the highest ranges can be prioritized for collapsing. Also, by further considering LUT size range criteria during processing, LUTs with large numbers of inputs (e.g., corresponding to larger amounts of PLD resources) can be used for collapsing critical connections associated with high weights.

Embodiments described above illustrate but do not limit the invention. It should also be understood that numerous modifications and variations are possible in accordance with the principles of the present invention. Accordingly, the scope of the invention is defined only by the following claims.

We claim:

1. A computer readable medium on which is stored a computer program which when executed by a computer system performs a method of selectively collapsing connections between a plurality of look up tables (LUTs) of a logic design, when executed the computer readable medium storing the computer program performs the method comprising:
   determining for each connection a timing slack value and a number of timing paths using the connection;
   calculating a weight for each connection based on at least the timing slack value and the number of timing paths;
   comparing the connections with collapsing criteria in an order based on the weights of the connections;
   collapsing connections that satisfy the collapsing criteria in the weight-based order,
   associating each connection with one of a plurality of weight intervals based on the weight of the connection; and
   the order of comparing connections with the collapsing criteria is based on the associated weight interval, with the weight intervals being considered in order of decreasing weight.

2. The computer readable medium of claim 1, wherein the collapsing criteria comprises a minimum weight percentage corresponding to a percentage of the largest weight of all connections fanning into one of the LUTs.

3. The computer readable medium of claim 1, wherein the collapsing criteria comprises a plurality of LUT size ranges identifying maximum LUT sizes that may be used to collapse connections associated with particular weights.

4. The computer readable medium of claim 1, wherein the collapsing comprises replacing one of the connections from a first LUT to a second LUT with at least a new connection from a third LUT to the second LUT.

5. The computer readable medium of claim 1, wherein the collapsing comprises:
   replacing one of the connections from a first LUT to a second LUT with at least a new connection from a third LUT to a fourth LUT and a new connection from a fifth LUT to the fourth LUT; and
   replacing the second LUT with the fourth LUT, wherein the fourth LUT is adapted to receive more connections than the second LUT.

6. The computer readable medium of claim 1, wherein the method further comprises selectively collapsing any of the connections fanning into LUTs having sizes less than or equal to a minimum LUT size.

7. The computer readable medium of claim 1, wherein the method further comprises removing one of the LUTs from the logic design if all connections fanning out from the one of the LUTs have been collapsed.

8. The computer readable medium of claim 1, wherein the method further comprises:
   performing an area analysis to determine a percentage of integrated circuit resources used by the logic design after performing the collapsing for a connection; and
   if the percentage of resources exceeds a maximum resource percentage, refraining from repeating the comparing and collapsing for other connections.

9. A computer readable medium on which is stored a computer program which when executed by a computer system performs a method of selectively collapsing connections between a plurality of look up tables (LUTs) of a logic design, when executed the computer readable medium storing the computer program performs the method comprising:
   determining for each connection a timing slack value and a number of timing paths using the connection;
   calculating a weight for each connection based on at least the timing slack value and the number of timing paths;
   comparing the connections with collapsing criteria in an order based on the weights of the connections; and
   collapsing connections that satisfy the collapsing criteria in the weight-based order,
   wherein the weight for each connection is calculated as follows:

$$w=\log(n+1)*s$$

where n is the number of timing paths using the connection and s is the maximum timing slack value of the timing paths using the connection.

10. A computer-implemented method of selectively collapsing connections between a plurality of look up tables (LUTs) of a logic design, the method comprising:
    determining, via a computer system, for each connection a timing slack value and a number of timing paths using the connection;
    calculating a weight for each connection based on at least the timing slack value and the number of timing paths;
    comparing the connections with collapsing criteria in an order based on the weights of the connections; and
    collapsing connections that satisfy the collapsing criteria in the weight-based order,
    wherein the weight for each connection is calculated as follows:

$$w=\log(n+1)*s$$

where n is the number of timing paths using the connection and s is the maximum timing slack value of the timing paths using the connection.

11. A programmable logic device designed by the method of claim 10.

12. The method of claim 10, wherein the collapsing criteria comprises a minimum weight percentage corresponding to a percentage of the largest weight of all connections fanning into one of the LUTs.

13. The method of claim 10, wherein the collapsing criteria comprises a plurality of LUT size ranges identifying maximum LUT sizes that may be used to collapse connections associated with particular weights.

14. The method of claim 10 including removing one of the LUTs from the logic design if all connections fanning out from the one of the LUTs have been collapsed.

15. The method of claim 10 including:
performing an area analysis to determine a percentage of integrated resources used by the logic design after performing the collapsing of a connection; and
if the percentage of resources exceeds a maximum resource percentage, refraining from repeating the comparing and collapsing for other connections.

16. A computer-implemented method of selectively collapsing connections between a plurality of look up tables (LUTs) of a logic design, the method comprising:
determining, via a computer system, for each connection a timing slack value and a number of timing paths using the connection;
calculating a weight for each connection based on at least the timing slack value and the number of timing paths;
comparing the connections with collapsing criteria in an order based on the weights of the connections;
collapsing connections that satisfy the collapsing criteria in the weight-based order;
associating each connection with one of a plurality of weight intervals based on the weight of the connection; and
the order of comparing connections with the collapsing criteria is based on the associated weight interval, with the weight intervals being considered in order of decreasing weight.

17. A system comprising:
a processor for executing a computer program;
memory for storing the computer program; and
a computer readable medium on which is stored the computer program which when executed by the processor in memory performs a method of selectively collapsing connections between a plurality of look up tables (LUTs) of a logic design, the method comprising:
determining for each connection a timing slack value and a number of timing paths using the connection;
calculating a weight for each connection based on at least the timing slack value and the number of timing paths;
comparing the connections with collapsing criteria in an order based on the weights of the connections; and
collapsing connections that satisfy the collapsing criteria in the weight-based order,
wherein the weight for each connection is calculated as follows:

$w = \log(n+1) * s$ where n is the number of timing paths using the connection and s is the maximum timing slack value of the timing paths using the connection.

* * * * *